United States Patent
Tang et al.

(10) Patent No.: US 7,092,054 B2
(45) Date of Patent: Aug. 15, 2006

(54) METHOD FOR FABRICATING A SEMI-TRANSMISSIVE REFLECTOR PLATE

(75) Inventors: Wen-Chung Tang, Chiayi Hsien (TW); Yao Peng, Yungho (TW); Hung-Huei Hsu, Hsinchu (TW); Wen-Jian Lin, Hsinchu (TW)

(73) Assignee: Prime View International Co., Ltd., Hsinchu (TW)

( * ) Notice: Subject to any disclaimer, the term of this patent is extended or adjusted under 35 U.S.C. 154(b) by 0 days.

(21) Appl. No.: 11/296,949

(22) Filed: Dec. 7, 2005

(65) Prior Publication Data

US 2006/0082707 A1    Apr. 20, 2006

Related U.S. Application Data

(62) Division of application No. 10/698,143, filed on Oct. 31, 2003, now Pat. No. 6,999,141.

(30) Foreign Application Priority Data

Nov. 12, 2002 (TW) ................................ 91133093 A

(51) Int. Cl.
  *G02F 1/1335* (2006.01)
  *G02F 1/1333* (2006.01)
  *G02F 1/13* (2006.01)
(52) U.S. Cl. ........................ 349/113; 349/114; 349/138; 349/187
(58) Field of Classification Search ................. 349/113, 349/114, 138, 187
See application file for complete search history.

(56) References Cited

U.S. PATENT DOCUMENTS

| 6,559,917 | B1 | 5/2003 | Ikeno | 349/113 |
|---|---|---|---|---|
| 6,683,666 | B1* | 1/2004 | Jang et al. | 349/113 |
| 6,822,708 | B1 | 11/2004 | Fujino | 349/113 |
| 6,859,246 | B1* | 2/2005 | Konno et al. | 349/128 |
| 2002/0171791 | A1* | 11/2002 | Anno et al. | 349/113 |
| 2003/0016322 | A1* | 1/2003 | Ha et al. | 349/113 |
| 2003/0058388 | A1 | 3/2003 | Nakayoshi et al. | 349/113 |
| 2004/0189896 | A1 | 9/2004 | Cho et al. | 349/113 |
| 2005/0012878 | A1 | 1/2005 | Sakamoto et al. | 349/113 |
| 2005/0018112 | A1 | 1/2005 | Jang et al. | 349/113 |
| 2005/0030450 | A1* | 2/2005 | Okamoto et al. | 349/113 |
| 2005/0243249 | A1* | 11/2005 | Kikkawa et al. | 349/113 |

OTHER PUBLICATIONS

Derwent ACC 2003 326367 (KR2002095543A), "Fabricating method of tft substrate for reflective LCD", J. H. Lee, Dec. 27, 2002.

* cited by examiner

*Primary Examiner*—Tarifur R. Chowdhury
(74) *Attorney, Agent, or Firm*—Dellett & Walters patenttm.us

(57) ABSTRACT

The method for fabricating reflector plate for a reflective liquid crystal display and the device is disclosed. The present invention includes the formation of a protection layer over the glass substrate having thin film transistors and a layer of transparent electrodes on top, followed by the formation of a layer of undulating resin over the protection layer. If the reflector plate to be produced is a semi-transmissive type, a light-transmitting region is created over the protection layer. Since the protection layer is created in advance of the undulating resin outgrowth, the present method can effectively prevent reflection from the exposure stage during the lithography process, thus the problem of abnormal pattern marks occurring on the reflective surface can be avoided, and the exposure time and the production yield are enhanced.

3 Claims, 4 Drawing Sheets

METHOD FOR FABRICATING A SEMI-TRANSMISSIVE REFLECTOR PLATE

This is a divisional application of U.S. patent application Ser. No. 10/698,143, filed Oct. 31, 2003, which is now U.S. Pat. No. 6,999,141.

BACKGROUND OF THE INVENTION

1. Field of the Invention

The present invention relates to reflector plates for a reflective liquid crystal display and methods for fabricating the same, in particular to a method for fabricating reflector plates that can prevent light reflections from the exposure stage during the formation of undulating resin outgrowth, in order to avoid abnormal patterns occurring on the reflective surface, and furthermore the present invention can also shorten the exposure time and increase production yield.

2. Description of Related Arts

Reflective liquid crystal displays in general employ an external light source to illuminate display images. This new type of reflective display can effectively reduce the need of using a back light source and can achieve considerable saving on power consumption, making it suitable for portable applications.

Reflective displays in general have a reflector plate on the display panel, replacing the conventional back-light portion. These reflector plates can be further classified into a full reflective type and a semi-transmissive type. The reflective type reflector plate is usually equipped with a front-light module which is used to supplement external light for the necessary illumination on a liquid crystal display. The semi-transmissive type reflector plate, like a half-mirror, is able to receive light from a back-light module in supplement of external light when the ambient light is insufficient. However, display devices having either the reflective type or the semi-transmissive type reflector plate do not need the front-light or back-light illumination in the normal conditions, so their power consumption can be reduced. As mentioned earlier, the reflective display having a reflective type reflector plate is usually equipped with a front-light module. When the external light is insufficient, the display device can switch to the front-light module to supplement the ambient light. However, the above-mentioned reflective light technology has the shortcoming of noise signals and this is yet to be solved. As a result, the semi-transmissive type reflector plate is more favored by users. The semi-transmissive type reflector plate is able to use a back light to supplement the ambient light. This is implemented by creation of an undulating resin outgrowth on the reflective surface of the reflector plate.

FIG. 7 shows the steps for fabricating a semi-transmissive type reflector plate. A glass substrate (70) is prepared with thin film transistors built on top; and, a layer of transparent electrical conductor such as indium-tin-oxide (ITO) is deposited over the surface. Since the glass substrate (70) has thin film transistors formed in advance of the transparent electrodes, a pixel region is formed in between the glass substrate (70) and the transparent electrodes (71) with a gate insulating layer (701) and a protection layer (702).

The transparent electrodes (71) are formed by spin coating a layer polymer resin on the surface to form a photo-resist layer (72); then the photo-resist layer is exposed to light in a lithography process to remove photo-resist in areas other than the pattern areas to create a photomask as shown in FIG. 7b; then a metal layer as shown in FIG. 7c, is deposited on the surface to create a reflective film (73); the metal deposits in the non-pattern areas are removed after photo-etching to form a light transmitting region (74), thus completing the formation of a reflective type reflector plate with undulating resin outgrowth.

The reflective film (73) can be a single layer or multiple layers of film. In the case of a 3-layer film, the materials used in different layers are molybdenum alloy (Mo), aluminum (Al), and molybdenum alloy (Mo) in that order.

FIGS. 8a~c shows the process of fabricating a reflective type reflector plate, in which the basic steps are similar to those used for a semi-transmissive type reflector plate, except that the step to create the light-transmitting region is not necessary for the reflective type reflector plate.

In the fabrication of the reflective type reflector plate mentioned above, it is necessary to point out that the process for fabricating the undulating resin outgrowth over the reflective surface will significantly affect the yield rate and the defect rate in the production of these reflector plates.

In detailed analysis of the fabrication process, the glass substrate (70) is placed on the exposure stage, and the photomask is precision aligned and fixed over the light projection areas of the exposure stage, a vacuum pad is then adhered to the bottom of the glass substrate (70) for firming the substrate, and the photo-resist layer is spin coated on the surface of the glass substrate (70) and exposed under light. In the process, the vacuum pad and the protrusion pins will cause light reflection from the exposure stage, leading to some undesired pattern marks on the surface due to uneven exposure of the photo-resist layer. The pattern marks still exist in a subsequent fabrication process of the reflective film (73). The pattern marks reflecting the shapes of the vacuum pad and the protrusion pins will be developed on the reflective film (73), thus seriously affecting the yield in the production of the reflector plates.

The problem of reflections from the exposure stage which will affect the yield rate of reflector plate output will have to be corrected.

SUMMARY OF THE INVENTION

The main object of the present invention is to provide a method for fabricating reflector plates of a reflective liquid crystal display that can prevent abnormal reflection from the exposure stage during the formation of the undulating resin outgrowth, thus it can prevent abnormal pattern marks occurring over the reflective surface, shorten the exposure time in the lithography process and improve the yield rate in the production of reflector plates.

The method for fabricating reflector plates of a reflective liquid crystal display comprises the steps of:

forming transparent electrodes after thin film transistors are built on top of a glass substrate;

depositing a protection layer over the transparent electrodes for shielding off light reflection from the exposure stage;

patterning the transparent electrodes and the protection layer to define the pixel grid through the steps of:

spin coating a photo-resist layer over the protection layer with polymer resin material;

removing resin materials in non-pattern areas of the photo-resist layer by light exposure and developing with a developing solution; and depositing a reflective film over the polymer resin.

In the above-mentioned fabrication process, the protection layer is created in advance of the undulating resin outgrowth; therefore it can effectively prevent reflection from the exposure stage that causes abnormal pattern marks on the reflective surface due to uneven exposure. The above-mentioned fabrication process applies to a reflective type reflector plate.

In the case of a semi-transmissive type reflector plate, after finishing the reflective film, there should be a photo etching process to remove the metal deposits over non-pattern areas to form a light-transmitting region on the reflective film.

The secondary object of the present invention is to create a protection layer in the pixel region at the same time as the formation of the thin film transistors on the glass substrate, so as to shield off reflection from the exposure stage during the lithography process and the development of uneven reflective surface.

The features and structure of the present invention will be more clearly understood when taken in conjunction with the accompanying drawings.

DETAILED DESCRIPTION OF THE PREFERRED EMBODIMENT

The present invention will hereinafter be described in reference to the six embodiments and the drawings. The fabrication process includes the steps of:

forming transparent electrodes after thin film transistors are built on top of a glass substrate;

depositing a protection layer over the transparent electrodes for shielding off light reflection from the exposure stage;

patterning the transparent electrodes and the protection layer to define the pixel grid, which is performed through a series of processes:

spin coating a photo-resist layer over the protection layer;

removing the resin materials in the non-pattern areas of the photo-resist layer by light exposure and development; and depositing a single or multiple layer reflective metal film.

This fabrication process starts with the pre-formation of a protection layer on the glass substrate in advance of the undulating resin outgrowth, thus enabling effective shielding of reflection from the exposure stage during lithography, which results in abnormal pattern marks occurring on the reflective surface due to uneven exposure.

Figure 1A:
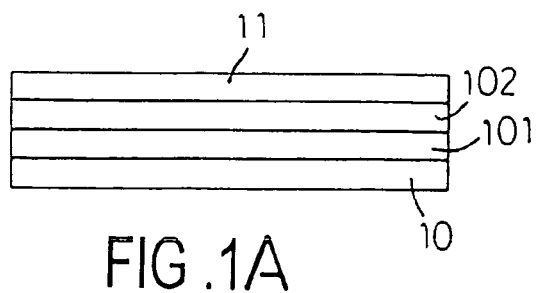
FIGS. 1a~d are the fabrication process of a reflective type reflector plate as implemented in the first embodiment.

The formation of transparent electrodes (11), as shown in FIG. 1A, it is performed after thin film transistors are built on top of a glass substrate (10), so that a pixel region is formed in between the glass substrate (10) and the transparent electrodes (11) have a gate insulating layer (101) and a protective layer (102).

Figure 1B:
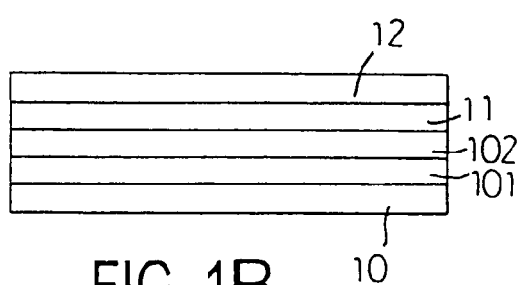

The forming of a protection layer (12), metal or non-metal, as shown in FIG. 1b, on the surface of the transparent electrodes (11) to shield off light reflection from the exposure stage during lithography. In the present embodiment the metal material used in the process is molybdenum alloy, or could be other metals such as AL, Cr, Cu, Co, Mo, Ti, W, Sn, Pb, Ag, Au, Ni, or Zr.

Figure 1C:
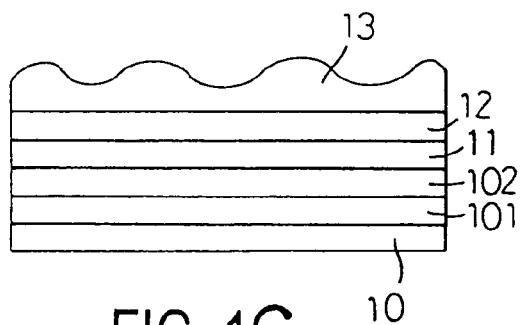

The patterning of the transparent electrodes (11) and the protection layer (12) is performed through the process of spin coating of the photo resist layer (13) over the protection layer (12) using polymer resin material, as shown in FIG. 1c; exposure with a photomask and development with a development solution to remove the resin material over the non-pattern areas.

Figure 1D:
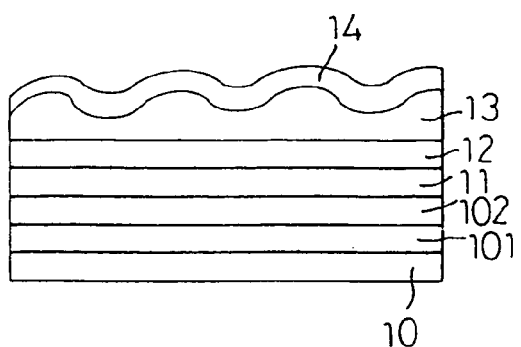

The deposition of a single or multiple layers of reflective metal film (14) as shown in FIG. 1d, is in accordance with the masked pattern. In the present embodiment, the reflective metal film (14) is formed by a three-layer film structure, composed of Molybdenum alloy, aluminum, and then Molybdenum alloy.

Figure 2A:
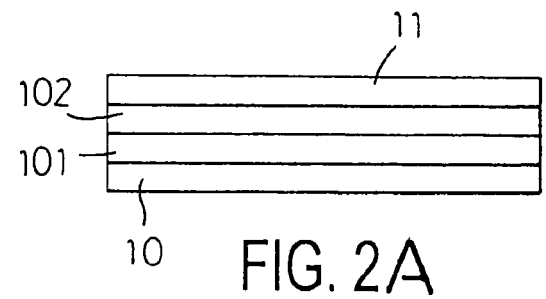
FIGS. 2a~d are the fabrication process of a semi-transmissive type reflector plate as implemented in the second embodiment.
Figure 2B:
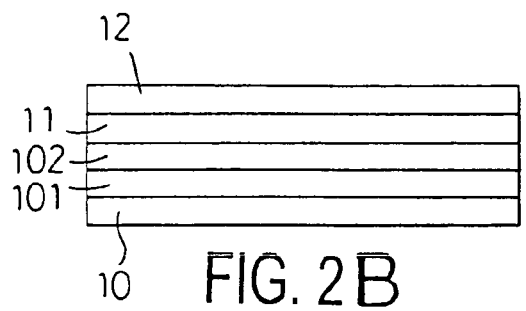
Figure 2C:
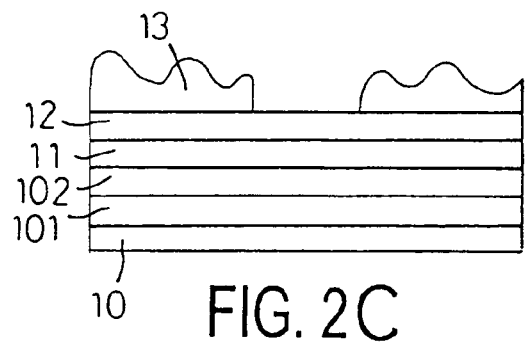
Figure 2D:
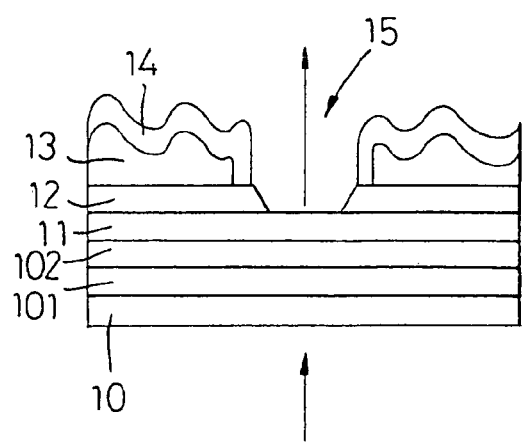

FIGS. 2a~c show the fabrication process to produce a semi-transmissive type reflector plate. The basic steps are identical to those used for the reflective type reflector plate, including deposition of the transparent electrodes, patterning the transparent electrodes and the protection layer, deposition of a photo-resist layer, exposure and development, and deposition of the reflective metal film, as shown in FIGS. 2a~c. However, in order to achieve partial light transmission through the reflector plate, there is an etching back process after the deposition of the reflective metal film, as shown in FIG. 2d, to remove some of the metal deposits on the protection layer (12) to create a light-transmitting region (15).

The present invention as it applies to the fabrication reflective type reflector plate and semi-transmissive type reflector plates in several of the preferred embodiments is more advantageous over the conventional method, which will be explained below:

Prevention of abnormal pattern marks occurring on the reflective surface: the protection layer enables light projections to be scattered evenly over the reflection surface of the protection layer, not in the regular reflection direction. Since the protection layer (12) is created in advance of the undulating resin outgrowth, the protection layer (12) can effectively shield off the reflections from the exposure stage, thus no image of the vacuum pad and the protruding pins will appear on the reflective surface, thus there will be no abnormal pattern marks on the reflective surface, and the yield rate of the reflector plate can also be improved.

Shortening the exposure time during lithography: the conventional processes use polymer resin material with low photosensitivity and thick body. The low photosensitivity resin could prolong the exposure time, and the thick body resin could cause uneven light exposure. However, in the present invention, highly photosensitive resin is used to shorten the exposure time, and the protection layer enables light projections to be scattered evenly over the surface of the protection layer, thus the necessary exposure time of the polymer resin can be shortened. For undulating resin without the protection layer, the light exposure time is about 120 mJ, but with the protection layer the light exposure time duration only takes 60 mJ. The light exposure time is shortened by as much as 50%, thus improving the output yield.

The present invention can be implemented with other fabrication processes besides those disclosed in the embodiments above:

FIG. 3 shows the fabrication process of a reflective type reflector plate as implemented in the third embodiment, which enables the reflective film to be formed at the same time as the thin film transistors over the glass substrate (10). Then, an undulating resin outgrowth is built over the reflective film.

The thin film transistors are first created on the glass substrate (10), then the gate electrodes, the gate insulating layer, and the protective layer are formed in that order. In the present embodiment, the protection layer in the pixel region is formed at the same time as the formation of the gate electrodes, through unified patterning for the metal interlayers, in the process of forming the thin film transistors. The advantages are that all the characteristics in the previous embodiment can be retained.

Figure 3A:
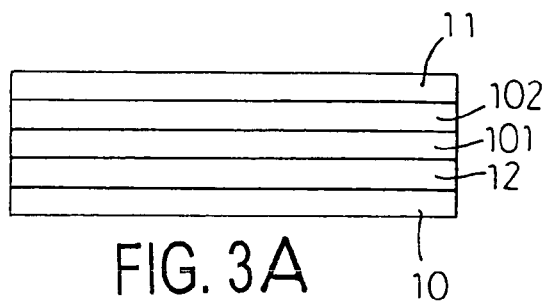
FIG. 3a~c are the fabrication process of a reflective type reflector plate as implemented in the third embodiment.
Figure 3B:
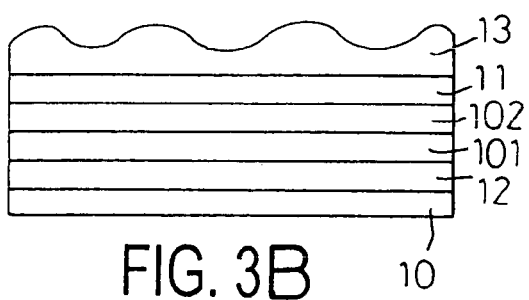
Figure 3C:
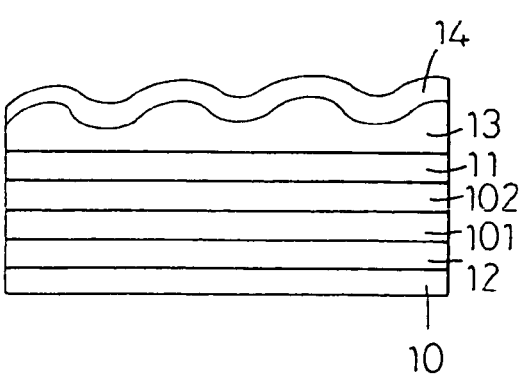

FIG. 3a shows the fabrication process of a full reflector plate as implemented in the third embodiment. During the formation of thin film transistors on the glass substrate (10), a protection layer (12) is formed at the same time as the gate insulating layer (101) in the pixel region. Then, the sequence of steps, as shown in FIGS. 3a~c, are performed over the glass substrate (10): deposition of the transparent electrodes, patterning of the transparent electrodes, deposition of the photo-resist layer, exposure and development, and deposition of the reflective metal film, to complete the fabrication of a full reflector plate.

Figure 4A:
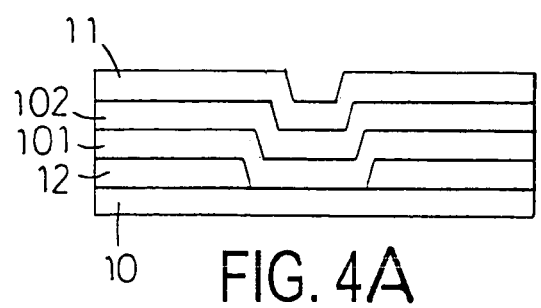
FIGS. 4a~c are the fabrication process of a semi-transmissive type reflector plate as implemented in the fourth embodiment.
Figure 4B:
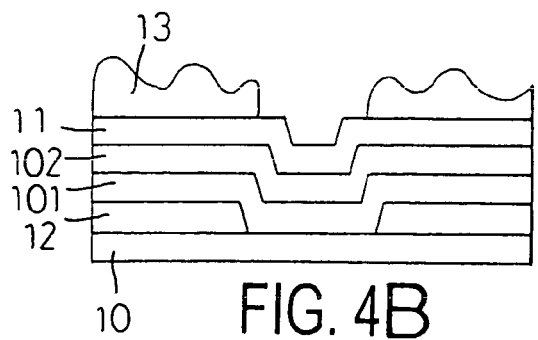
Figure 4C:
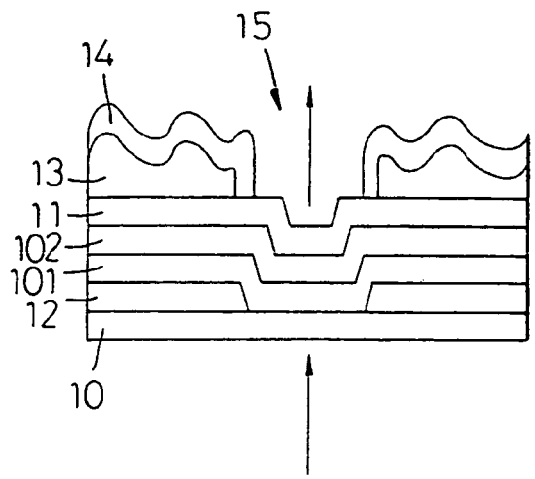

FIG. 4 shows the fabrication process of semi-transmissive type reflector plate in the fourth embodiment, which is basically identical to that of the third embodiment, with the addition of an etching back process to create the light-transmitting region.

Figure 5A:
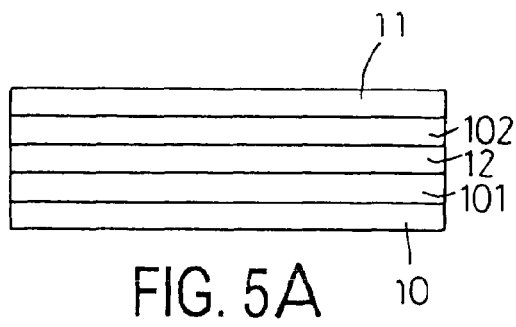
FIGS. 5a~c are the fabrication process of a reflective type reflector plate as implemented in the fifth embodiment.
Figure 5B:
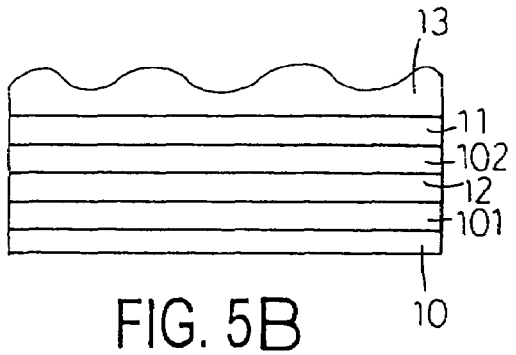
Figure 5C:
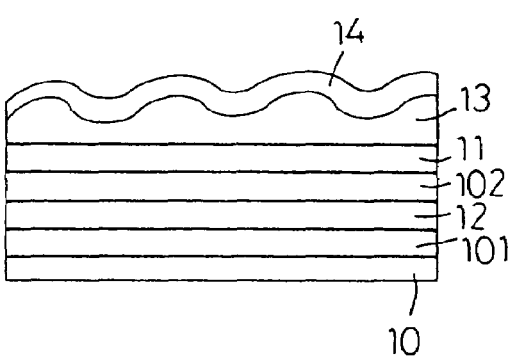

FIG. 5 shows the fabrication process for a transmissive type reflector plate in the fifth embodiment. The process steps largely resemble those used in the third and fourth embodiments in that the part of protection layer is formed at the same time as the thin film transistors, but the difference is that the source/drain electrodes and the protection layer are formed at the same time in the process of forming the thin film transistors through unified patterning. It can be seen, from FIG. 5a, after the thin film transistors are built on top of the glass substrate (10), a protection layer (12) is formed at the same time as the gate electrodes in between the gate insulating layer (101) and the protection layer (102) the protection layer (12). Subsequent steps in the fabrication process, as shown in FIGS. 5a~c, are to be performed over the glass substrate (10) in the order of: deposition of the transparent electrodes, patterning of the transparent electrodes, spin coating of the photo-resist layer, exposure and development, and deposition of the reflective metal film. This process is for fabrication of a full reflector plate.

Figure 6A:
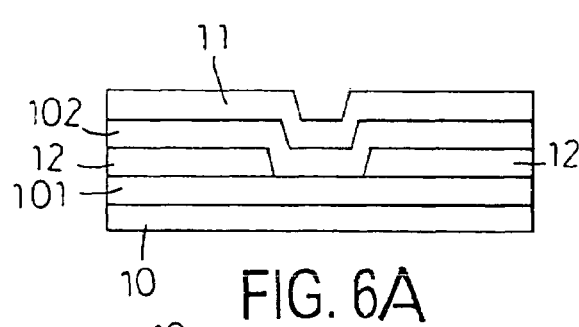
FIGS. 6a~c are the fabrication process of a semi-transmissive type reflector plate as implemented in the sixth embodiment.
Figure 6B:
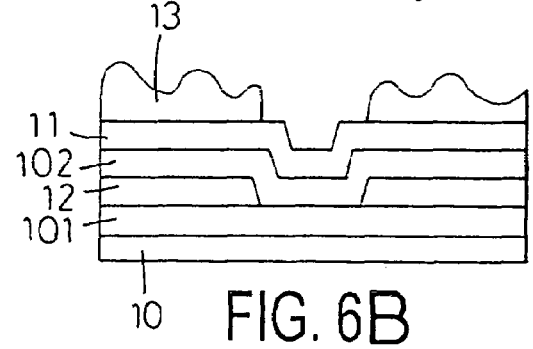
Figure 6C:
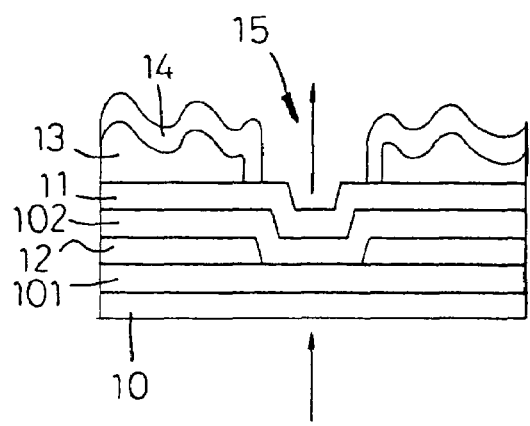
Figure 8A:
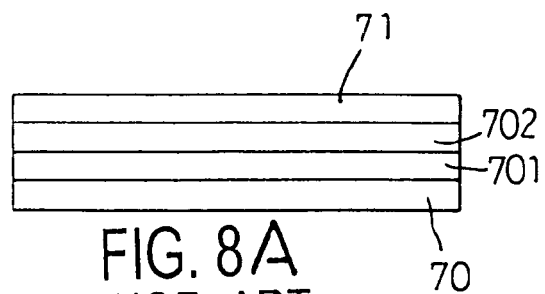
FIGS. 8a~c are the conventional fabrication process of a reflective type reflector plate of display device.
Figure 7A:
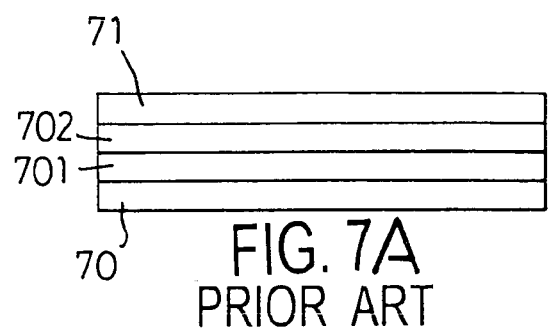
FIGS. 7a~c are the conventional fabrication process for a semi-transmissive type reflector plate of display device.
Figure 8B:
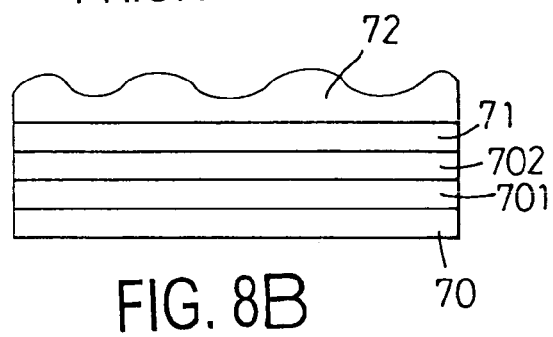
Figure 7B:
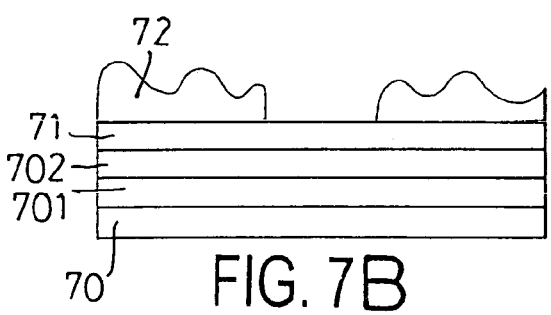
Figure 8C:
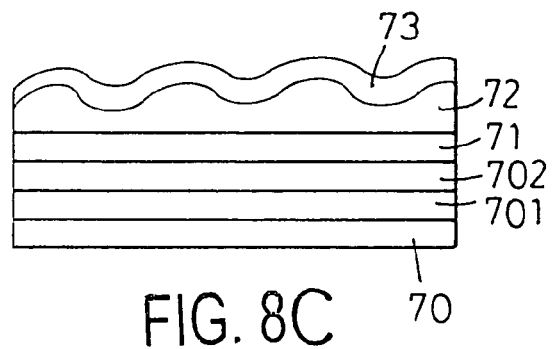
Figure 7C:
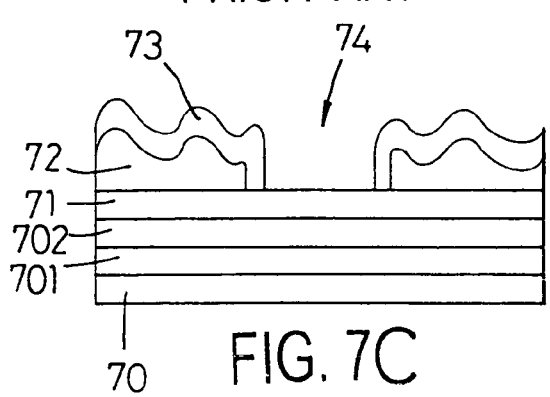

FIG. 6 shows the fabrication process for a semi-transmissive type reflector plate in the sixth embodiment, wherein the only difference in the fabrication process versus the fifth embodiment is the addition of an etching back process to form the light-transmitting region.

The foregoing description of the preferred embodiments of the present invention is intended to be illustrative only and, under no circumstances, should the scope of the present invention be so restricted.

What is claimed is:

1. A method for fabricating a semi-transmissive type reflector plate of a reflective liquid crystal display, the method comprising acts of:

preparing a glass substrate with thin film transistors built on a surface of the glass substrate;

forming transparent electrodes over the glass substrate after the thin film transistors are built on the glass substrate;

depositing a protection layer over the transparent electrodes;

patterning the transparent electrodes and the protection layer to form pixel patterns;

spin coating a photoresist layer over the protection layer;

removing the photoresist layer over non-patterned areas;

etching the protection layer on the non-patterned areas to create a light-transmitting region;

depositing a reflective metal film over the photoresist layer retained on the glass substrate;

wherein after the protection layer is deposited over the transparent electrodes, the protection layer shields undesired reflection light during an exposure stage and reduces the exposure time.

2. The method as claimed in claim 1, wherein the protection layer is metal material.

3. The method as claimed in claim 1, wherein the protection layer is non-metal material.

* * * * *